United States Patent [19]
Braun et al.

[11] Patent Number: 5,182,512
[45] Date of Patent: Jan. 26, 1993

[54] METHOD AND APPARATUS FOR DETERMINING RELATIVE CONTRIBUTIONS OF INDIVIDUAL CYLINDERS OF INTERNAL COMBUSTION ENGINE USING CONTACT TACHOMETER

[75] Inventors: Robert D. Braun; Matthew M. Crass; James R. Piehl; David J. Schend; Gary S. Wollert, all of Kenosha; Jerry W. Mueckl, Franklin; Thomas P. Becker, Kenosha, all of Wis.

[73] Assignee: Snap-on Tools Corporation, Kenosha, Wis.

[21] Appl. No.: 604,191

[22] Filed: Oct. 29, 1990

[51] Int. Cl.$^5$ .................. G01P 3/50; G01M 15/00
[52] U.S. Cl. .................. 324/175; 73/529; 73/116; 324/378
[58] Field of Search .......... 364/431.07, 431.03, 364/550, 565; 73/529, 116, 117.2, 117.3, 488, 489, 518, 527; 324/160, 161, 163, 166, 168, 169, 170, 172, 175, 178, 207.11, 207.25, 378; 341/13, 31, 137; 356/27, 28, 29

[56] References Cited

U.S. PATENT DOCUMENTS

| | | | |
|---|---|---|---|
| 3,263,668 | 8/1966 | Strauss, Jr. | 125/11.01 |
| 3,497,959 | 3/1970 | Engelsman . | |
| 3,601,585 | 8/1971 | Paulsen | 324/166 X |
| 3,675,199 | 7/1972 | Jamison et al. . | |
| 3,707,678 | 12/1972 | Champagnon | 324/160 |
| 3,727,033 | 4/1973 | Bassist . | |
| 3,780,297 | 12/1973 | Geary . | |
| 3,896,377 | 7/1975 | Richardson | 324/161 |
| 3,990,302 | 11/1976 | Reeves et al. | 324/379 X |
| 4,000,465 | 12/1976 | Sugiyama | 324/166 |
| 4,061,026 | 12/1977 | Goodfriend et al. | 73/116 |
| 4,179,922 | 12/1979 | Bouverie et al. | 73/116 |
| 4,236,449 | 12/1980 | Price | 324/175 X |
| 4,259,637 | 3/1981 | Bloomfield et al. | 324/175 X |
| 4,295,363 | 10/1981 | Buck et al. | 73/117.3 |
| 4,301,678 | 11/1981 | Full et al. | 73/116 |
| 4,312,043 | 1/1982 | Frank et al. | 324/391 X |
| 4,348,893 | 9/1982 | Hendrix et al. | 73/116 |
| 4,383,440 | 5/1983 | Murata | 73/117.3 |
| 4,445,087 | 4/1984 | Mehnert | 324/175 |
| 4,472,881 | 9/1984 | Houck . | |
| 4,506,339 | 3/1985 | Kuhnlein | 364/565 |
| 4,525,781 | 6/1985 | Konomi et al. | 364/431.01 |
| 4,539,841 | 9/1985 | Schroeder et al. | 73/116 |
| 4,562,728 | 1/1986 | Timmerman | 73/116 |
| 4,580,445 | 4/1986 | Janetzke et al. | 73/116 |
| 4,625,546 | 12/1986 | Sugo et al. | 73/116 |
| 4,759,212 | 7/1988 | Sawada et al. | 73/118.1 |
| 4,799,380 | 1/1989 | Suzuki et al. | 73/116 |
| 4,804,921 | 4/1989 | Patrow et al. | 324/103 P X |
| 4,823,080 | 4/1989 | Lin | 324/175 |
| 4,843,870 | 7/1989 | Citron et al. | 73/116 |
| 4,860,585 | 8/1989 | Tuyn et al. . | |

Primary Examiner—Gerard R. Strecker
Assistant Examiner—W. S. Edmonds
Attorney, Agent, or Firm—Emrich & Dithmar

[57] ABSTRACT

A linearly moving external part on a multi-cylinder internal combustion engine is contacted with a hand-held rotary encoder, contact tachometer having a hollow handle in which processing circuitry is disposed for converting the rotary encoder output to a waveform signal. This signal, along with a signal responsive to the firing of the number one cylinder, are applied to an engine analyzer processor for display of a single engine cycle of the waveform signal on the CRT oscilloscope of the engine analyzer. The variations in amplitude of the waveform signal correspond to speed variations of the moving part over an engine cycle to give an indication of the relative power contributions of the individual cylinders.

17 Claims, 3 Drawing Sheets

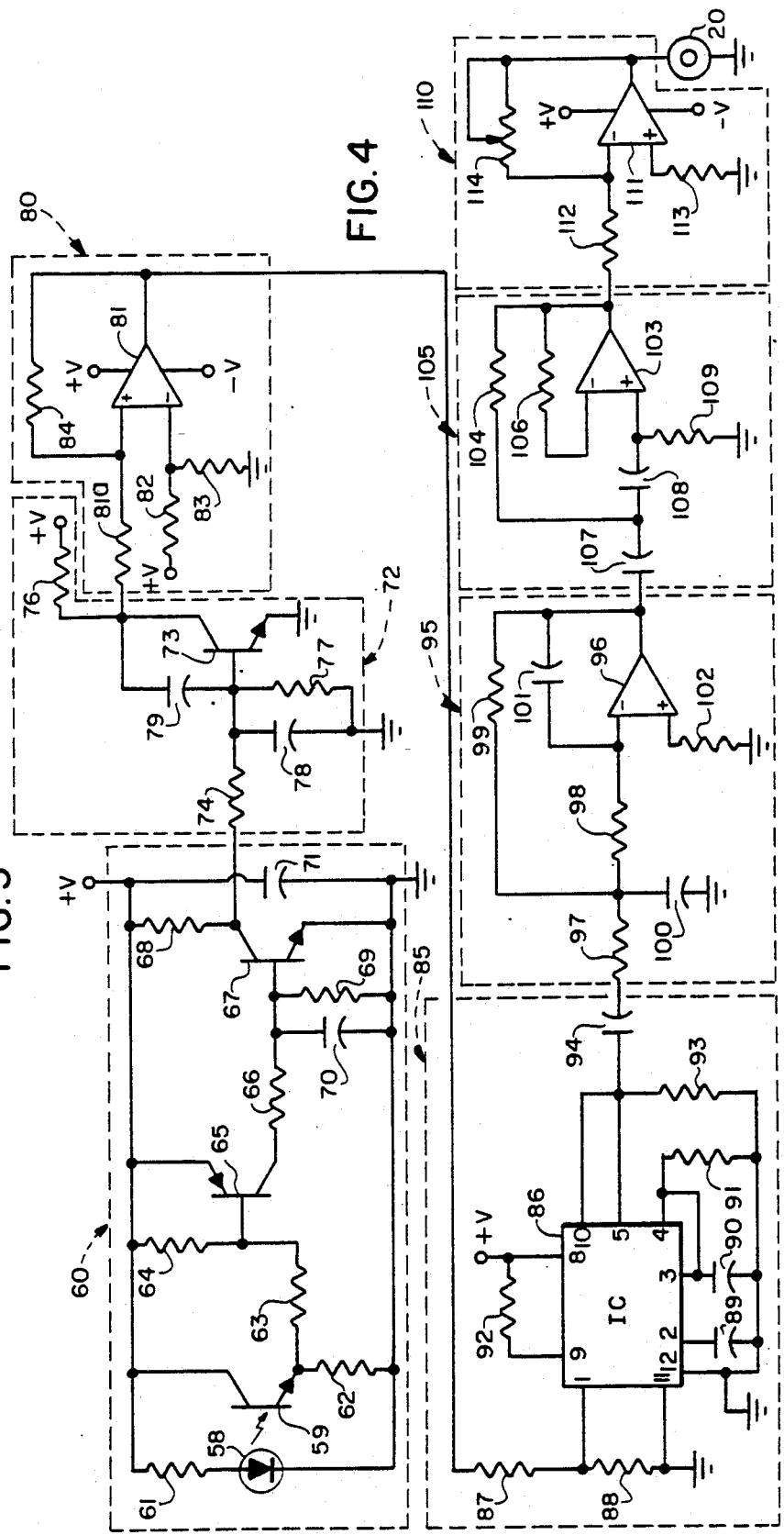

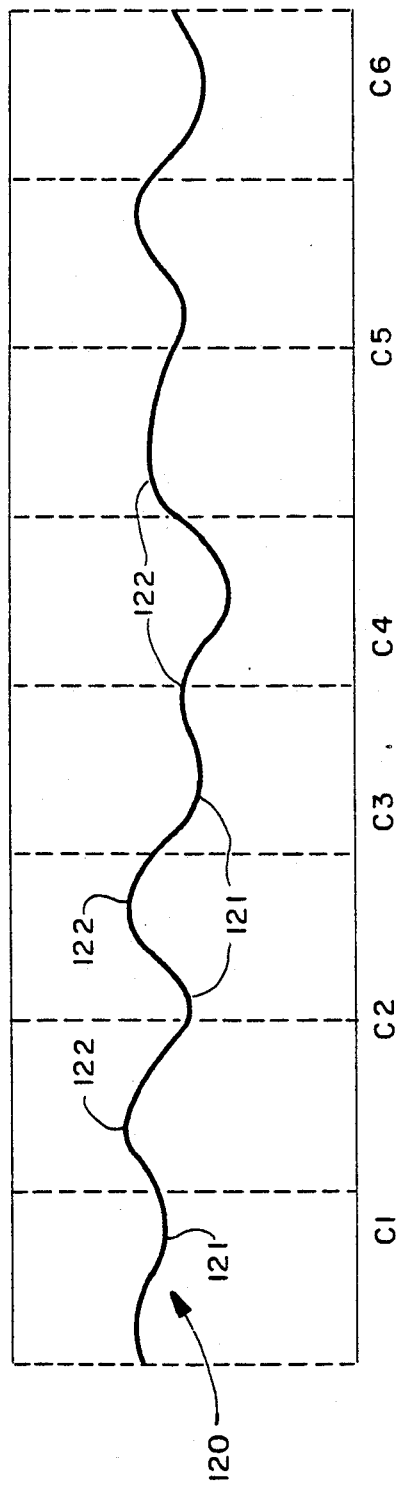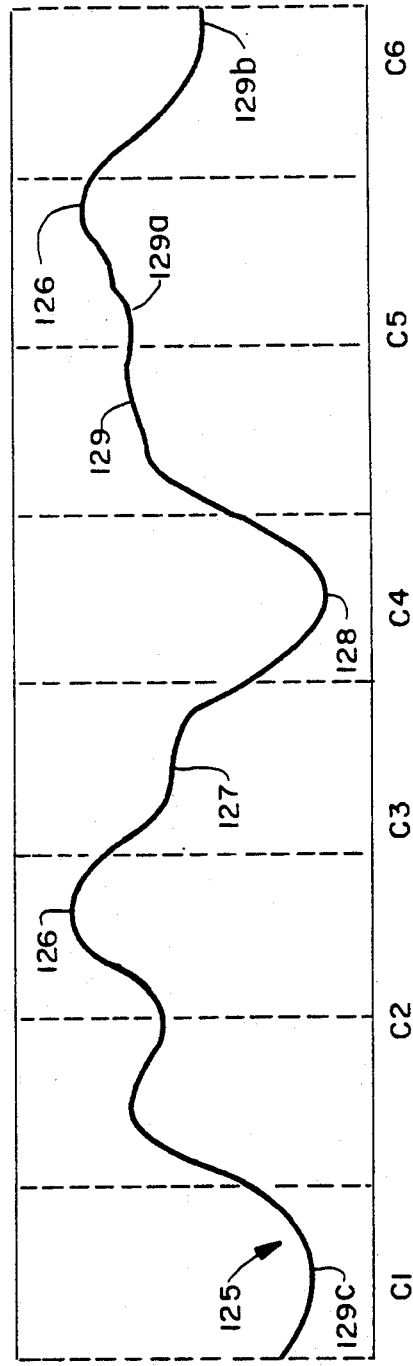

METHOD AND APPARATUS FOR DETERMINING RELATIVE CONTRIBUTIONS OF INDIVIDUAL CYLINDERS OF INTERNAL COMBUSTION ENGINE USING CONTACT TACHOMETER

BACKGROUND OF THE INVENTION

1. Field of the Invention

The present invention relates to analysis of the relative power contributions of individual cylinders of an internal combustion engine and, in particular, relates to techniques for determining such power contributions from variations in the engine speed.

2. Description of the Prior Art

Heretofore, in order to analyze the relative power contributions of individual cylinders of a multi-cylinder internal combustion engine, a technique known as "cylinder shorting" was used. In this technique, the contribution of an individual cylinder to the overall power output of the engine is determined by "shorting", or preventing the occurrence of the ignition event of a cylinder and noting the resultant change in engine speed in rpm. An ignition event is the firing of the spark plug in the case of a gasoline engine or the fuel injection in the case of a diesel engine. If the cylinder were contributing no power, then the shorting of that cylinder would not decrease the engine speed. If, on the other hand, the individual cylinder were a normal contributor to the overall power then, when it is shorted, the speed of the engine would drop. If each individual cylinder normally contributed a like amount to the overall engine power then, when it is shorted, each cylinder would cause the same drop in engine speed.

In modern computer-controlled engines, with catalytic converters, it is difficult and potentially harmful to short out cylinders. Accordingly, alternative techniques of measuring the cylinder power balance have been developed. Thus, it has been found that the speed variation of the engine within a single engine cycle can give an indication of the cylinder power balance. In normal operation, each time a cylinder ignition event occurs, the power stroke of that piston causes the engine to accelerate momentarily. The engine speed increases to a peak and then begins to decrease as the engine "coasts" until the ignition event for the next cylinder in the firing order. Thus, in a normally operating engine, a plot of the engine speed against time over a single engine cycle is in the shape of a generally sinusoidal waveform with one period or cycle of the waveform for each cylinder. If all cylinders are contributing equally to the overall engine power, the peaks of this waveform should all be at substantially the same height.

One system for determining power balance by analyzing engine speed variations over a single engine cycle is disclosed in U.S. Pat. No. 4,539,841. In this system, the engine speed is sensed by use of an electromagnetic sensor positioned adjacent to the teeth on the engine flywheel or ring gear. The sensor senses the passing of the teeth of the ring gear as it is rotated and provides an alternating output, the frequency of which is proportional to the engine speed. While this permits fairly accurate monitoring of engine speed, it has the disadvantage that it requires measurement of the absolute engine speed. Furthermore, the installation of the sensor is very cumbersome and time consuming. The ring gear is relatively inaccessible in most engines and the installation of the electromagnetic sensor is critical. It must be very precisely positioned relative to the gear teeth and this position must be accurately maintained in order for the system to work properly.

SUMMARY OF THE INVENTION

It is a general object of the invention to provide an improved method and apparatus for determining cylinder power balance in an internal combustion engine, which avoids the disadvantages of prior techniques while affording additional structural and operating advantages.

An important feature of the invention is the provision of a method of determining cylinder power balance from engine speed variations during a single engine cycle, which is relatively simple and easy to perform.

In connection with the foregoing feature, another feature of the invention is the provision of a method of the type set forth which does not require the sensing of actual engine speed.

In connection with the foregoing features, a still further feature of the invention is the provision of a method of the type set forth, which does not require accurate and precise positioning of a speed sensing element relative to the engine.

Yet another feature of the invention is the provision of a method of the type set forth which requires access to only easily accessible parts of the engine.

Another feature of the invention is the provision of an apparatus for performing the method of the type set forth.

In connection with the foregoing feature, it is another feature of the invention to provide an apparatus which incorporates a portable hand-held speed sensing device.

These and other features of the invention are attained by providing apparatus for determining the relative power contributions of individual cylinders of a multi-cylinder internal combustion engine having an external moving part accessible from outside the engine and which moves at a speed proportional to the speed of the engine, wherein an engine cycle is the time period between consecutive ignition events of the same cylinder, the apparatus comprising: handheld speed sensing means for detecting the speed variations of the external moving part of the engine during an engine cycle, processing means coupled to said speed sensing means and generating a waveform signal representative of the speed variations of the moving part over time, and display means coupled to the processing means for displaying a single engine cycle of the waveform signal.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 3 is a view in vertical section taken along the line 3—3 in FIG. 2, with portions of the tachometer removed;

FIG. 4 is a schematic diagram of the electronic circuitry of the tachometer of FIG. 3;

FIG. 5A is a plot of speed against time of a measured moving part of the engine over a single engine cycle for a normally operating six-cylinder engine; and FIG. 5B is a plot similar to FIG. 5A for an engine with two of the cylinders misfiring.

DESCRIPTION OF THE PREFERRED EMBODIMENT

Figure 1:
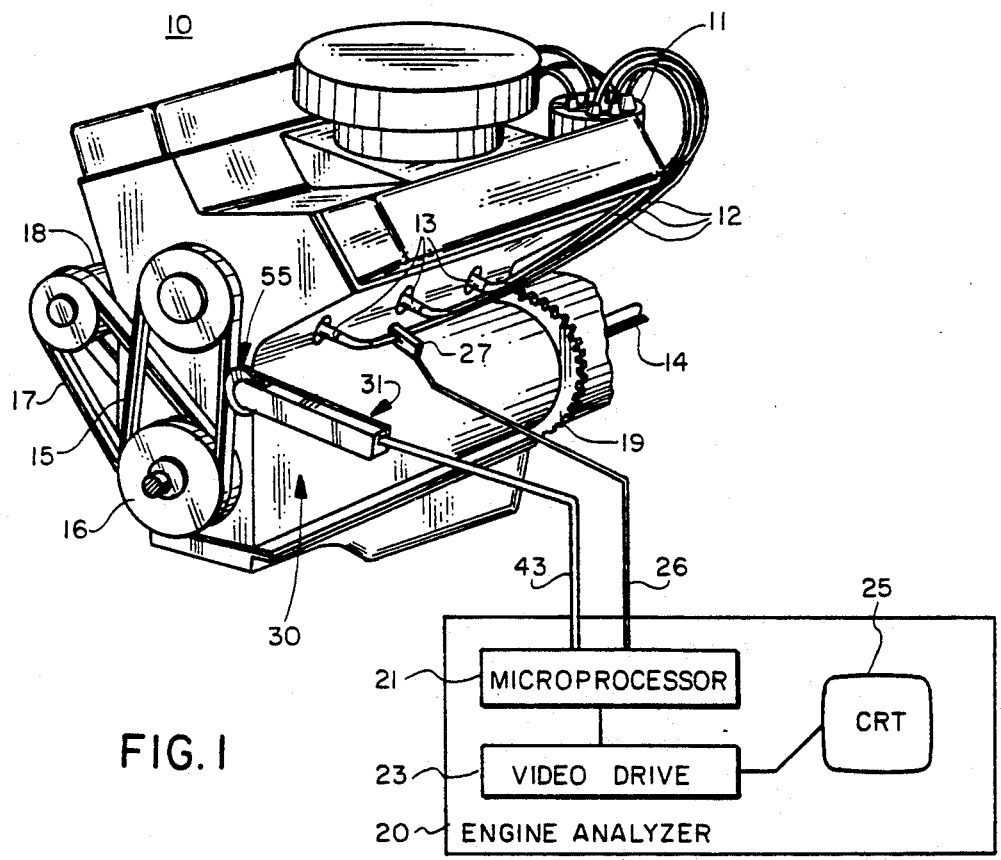
FIG. 1 is a block diagrammatic illustration of the apparatus of the present invention, coupled to an internal combustion engine shown in front perspective view, with portions broken away for clarity of illustration.

Referring to FIG. 1 there is illustrated a multicylinder internal combustion engine, generally designated by the numeral 10, of a type with which the present invention is useful. The engine 10 is shown as a V-6 gasoline engine, but it will be appreciated that the present invention may be used with any other configuration of multicylinder internal combustion engine. The engine 10 has a distributor 11 which is coupled by wires 12 to spark plugs 13, respectively positioned for igniting the fuel mixture in each of the several cylinders in standard fashion. The engine has an output crankshaft 14. A fan belt 15 is coupled to a pulley 16 at the front end of the crankshaft 14 for driving a cooling fan or other associated equipment. Similarly, a generator belt 17 is coupled to the pulley 16 for driving a generator or alternator 18. The crankshaft 14 is also coupled to a flywheel or ring gear 19 for coupling to an associated transmission (not shown) in a known manner.

The present invention includes an engine analyzer 20, which may of the type disclosed in U.S. Pat. No. 4,800,378, and includes a microprocessor 21 coupled to a video drive circuit 23 which is, in turn, connected to a CRT oscilloscope 25. The engine analyzer 20 may include a plurality of input leads, one of which is a conductor 26 coupled to a pickup 27, which may be an inductive or capacitive pickup and is adapted to be coupled to the wire 12 for the no. 1 spark plug 13, i.e., the spark plug for the cylinder which has been designated by the manufacturer as the first cylinder in the firing order. In the case of a diesel engine a piezoelectric pickup may be used in a similar manner.

Figure 2:
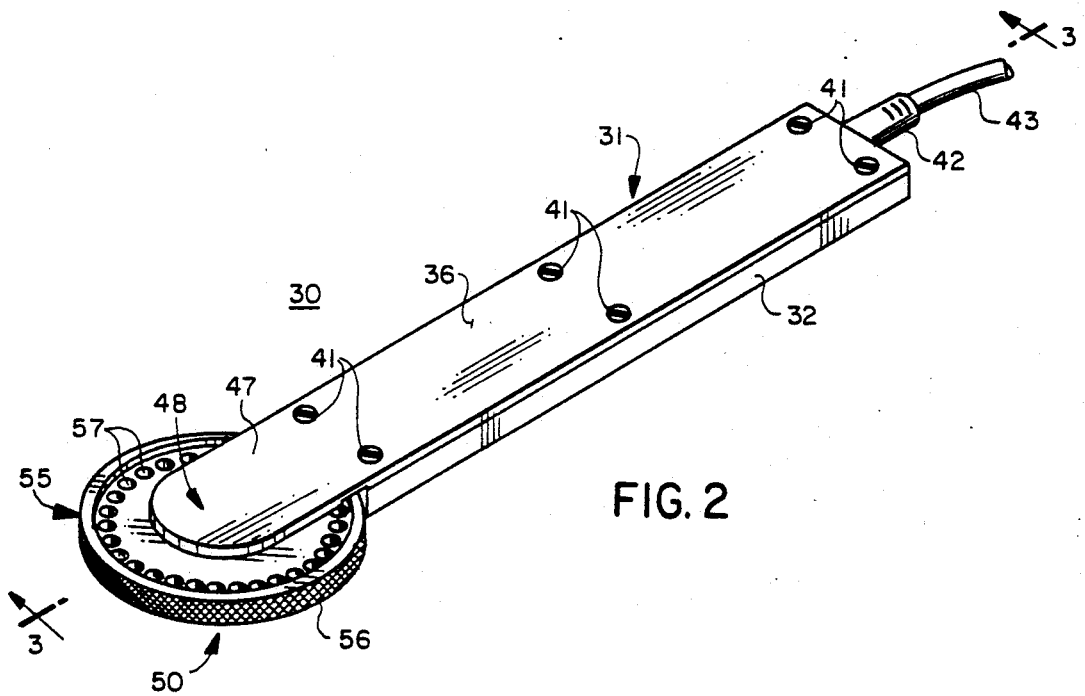
FIG. 2 is an enlarged perspective view of the contact tachometer of the apparatus illustrated in FIG. 1.

Referring also to FIGS. 2 and 3, the invention also includes a contact tachometer 30 having an elongated handle 31 which is generally in the shape of a rectangular hollow box. The handle 31 is of two-part construction, including a base 32 and a cover 36. The base 32 is in the nature of a rectangular plate having an enlarged rectangular main cavity 33 in the upper surface thereof extending along the major portion of the length thereof, a semi-cylindrical cord cavity 34 at one end thereof communicating with the main cavity 33 and a semi-cylindrical bearing cavity 35 adjacent to the other end thereof. Similarly, the cover 36 has formed in its underside an elongated main rectangular cavity 37, a semi-cylindrical cord cavity 38 formed at one end communicating with the main cavity 37 and a semi-cylindrical bearing cavity 39 adjacent to the other end thereof. The base 32 and the cover 36 are joined together with the main cavities 33 and 37 thereof cooperating to define a large rectangular chamber 40, the parts being secured together by a plurality of suitable fasteners, such as threaded fasteners 41. The cavities 34 and 38 cooperate to define a passage receiving a grommet 42 or other suitable strain-relief member through which is received an electrical cord 43 carrying a plurality of conductors and adapted to be connected to one of the input terminals of the engine analyzer 20. The cord 43 is adapted to be connected to a printed circuit board 45 which is disposed in the chamber 40 and secured in place by suitable means (not shown).

The ends of the base 32 and the cover 36 opposite the cord 43 respectively define rounded-end arms 46 and 47, the inner surfaces of which are spaced apart a predetermined distance in the assembled condition of the tachometer 30 and cooperate to define a clevis 48 for rotatably receiving therebetween an encoder wheel 55 of a rotary encoder assembly 50. More specifically, the cavities 35 and 39 cooperate to define a chamber in which are disposed bearings 51 for rotatably supporting the hub 52 of the encoder wheel 55. The wheel 55 is generally disk-shaped, having a cylindrical outer peripheral surface 56 which may be provided with a suitable frictional gripping material. A plurality of holes 57 extend through the wheel 55, the holes 57 being equiangularly spaced apart and arranged in a circular pattern coaxial with the wheel 55 and disposed between the hub 52 and the peripheral surface 56.

The wheel 55 has a diameter such that it extends laterally well beyond the end of the clevis 48 and also extends into the main chamber 40. Respectively mounted on the base 32 and the cover 36 in the chamber 40 are a light emitting diode (LED) 58 and a phototransistor 59, which are positioned along a common axis parallel to the axis of rotation of the wheel 55 and spaced radially therefrom a distance equal to the radius of the circular pattern of the holes 57. Thus, the LED 58 and the phototransistor 59 cooperate with the holes 57 to establish a beam of light which shines through the holes 57 and is repeatedly interrupted as the wheel 55 rotates. It will be appreciated that the LED 58 and the phototransistor 59 are connected by suitable conductors to the printed circuit board 45.

Referring now to FIG. 4, there is illustrated the circuitry of the contact tachometer 30, all of which, except for the LED 58 and the phototransistor 59, may be mounted on the printed circuit board 45. This circuitry includes an encoder circuit 60 which serves to generate a pulsating output signal from the rotary encoder assembly 50. The LED 58 is connected in series with a resistor 61 between ground and a +V supply voltage provided by the engine analyzer 10. Similarly, the phototransistor 59 is connected in series with a resistor 62 across the +V supply. The emitter of the phototransistor 59 is connected to the +V supply through series resistors 63 and 64, the junction therebetween being connected to the base of a transistor 65. The emitter of the transistor 65 is connected to the +V supply, while its collector is connected through a resistor 66 to the base of a transistor 67, the emitter of which is grounded and the collector of which is connected to the +V supply through a resistor 68. Connected in parallel across the base-emitter junction of the transistor 67 are a resistor 69 and a capacitor 70. A capacitor 71 is connected across the +V supply.

The output of the encoder circuit 60 is connected to a buffer amplifier 72 which includes a transistor 73. More specifically, the output of the encoder circuit 60 is taken from the collector of the transistor 67, which is connected through a resistor 74 to the base of the transistor 73, the emitter of which is grounded and the collector of which is connected to the +V supply through a resistor 76. A resistor 77 and a capacitor 78 are connected in parallel across the base-emitter junction of the transistor 73, while a capacitor 79 is connected across the base-collector junction of the transistor 73.

The output of the buffer amplifier 72 is connected to a comparator 80 which includes an integrated circuit (IC) operational amplifier (op amp) 81, which is provided with +V and −V supply voltages and is configured as a comparator. More specifically, the output of the buffer amplifier 72 is taken from the collector of the transistor 73, which is connected through a resistor 81a to the non-inverting input terminal of the op amp 81. The +V supply is connected through a resistor 82 to the inverting input terminal of the op amp 81, which terminal is also connected through a resistor 83 to ground. The output of the op amp 81 is connected to its non-inverting input terminal through a feedback resistor 84.

The output of the comparator 80 is connected to the input of a frequency-to-voltage converter 85 which includes an IC converter 86, which may be an LM2917, made by National Semiconductor. More specifically, the output of the comparator 80 is connected through a resistor 87 to pin 1 of the IC 86, pin 11 of which is connected to ground. A resistor 88 is across pins 1 and 11. Pin 12 is also connected directly to ground, while pins 2 and 3 are respectively connected through capacitors 89 and 90 to ground. Pin 4 is connected directly to pin 3 and is also connected through a resistor 91 to ground. Pin 5 is connected directly to pin 10 and is also connected through a resistor 93 to ground. The +V supply is connected directly to pin 8 and through a resistor 92 to pin 9 of the IC 86.

The output of the IC 86 is taken from pin 5 and is connected through a capacitor 94 to a low pass filter 95 which includes an op amp 96. More specifically, the capacitor 94 is connected through series resistors 97 and 98 to the inverting input terminal of the op amp 96, the junction between these resistors being connected through a resistor 99 to the output of the op amp 96 and through a capacitor 100 to ground. The output of the op amp 96 is also connected to its inverting input terminal through a capacitor 101. The non-inverting input terminal of the op amp 96 is connected to ground through a resistor 102.

The output of the low pass filter 95, taken from the output of the op amp 96, is connected to a high pass filter 105. More specifically, the output of the op amp 96 is connected through series capacitors 107 and 108 to the noninverting input terminal of an integrated circuit op amp 103, the junction between these capacitors being connected through a resistor 104 to the output of the op amp 103. The output of the op amp 103 is also connected to its inverting input terminal through a resistor 106, while the noninverting input terminal of the op amp 103 is connected to ground through a resistor 109.

The output of the high pass filter 105 is connected through an output level adjusting circuit 110 to the input of the engine analyzer 20. More specifically, the output level adjusting circuit 110 includes an IC op amp 111 which is provided with +V and −V supply voltages. The inverting input terminal of the op amp 111 is connected through a resistor 112 to the output of the high pass filter 105 which is received from the op amp 103. The non-inverting input terminal of the op amp 111 is connected to ground through a resistor 113, while the inverting input terminal is connected to the output of the op amp 111 through a potentiometer 114.

The LED 58 may be an infrared LED which is energized through the resistor 61, which limits current and provides means for adjusting the light intensity. The photo-transistor 59 is connected in the common-collector configuration. When the phototransistor 59 is dark, current through the resistors 62 and 63 turns on the transistor 65. The resistor 64 acts to ensure turn-off of the transistor 65 when the phototransistor 59 is turned on by a light from the LED 58. The transistor 65, in the common-emitter configuration, amplifies the semisinusoidal waveform from the phototransistor 59, causing it to slew from the power supply ground to the positive voltage rail, and operates through the resistor 66 to turn on the transistor 67, which further amplifies the signal and generates an output square wave. The resistor 69 ensures turn-off of the transistor 67, and the capacitor 70 acts to shunt high frequency noise to ground. The resistor 68 is the output load resistor. The capacitor 71 is a power supply bypass capacitor.

The output of the encoder circuit 60 is buffered by the transistor 73. The resistors 74, 76 and 77 provide a DC bias for the transistor 73, with the capacitors 78 and 79 forming an input voltage divider to prevent a low logic level output from the encoder circuit 60 from turning on the transistor 73. The capacitor 78 also filters noise generated by the encoder circuit 60. The capacitor 79 also limits the high frequency switching response time of the transistor 73 to provide further noise filtering.

The comparator 80 squares the buffered encoder signal, so as to provide the frequency-to-voltage converter 85 with a fast switching transition, improving its accuracy. The inverting input to the op amp 81 is biased to a reference voltage provided by the voltage divider of resistors 82 and 83 to ensure that the trip point of the comparator is above the low logic level of the preceding buffer stage. The resistor 81a matches the impedance into the non-inverting input of the op amp 81 with that of the inverting input. The resistor 84 provides hysteresis to the comparator switching point.

The IC 86 converts frequency into voltage. The resistors 87 and 88 form a voltage divider to reduce the input signal voltage applied to an internal voltage comparator which forms the first stage of the circuitry of the IC 86. The comparator is referenced to the voltage of pin 11, i.e., ground. A charge pump follows the internal comparator and requires an external timing capacitor 89, a load resistor 91 and an integrating or filter capacitor 90. The current through the capacitor 89 is accurately mirrored to answer the load resistor 91. The capacitor 90 integrates the current pulses through the resistor 91, and thus determines the output ripple voltage and the response time of the charge pump. A buffer and emitter follower form the last stages of the IC 86 circuitry, producing an output voltage across the external load resistor 93.

The bypass capacitor 94 blocks the DC component of the output of the frequency-to-voltage converter 85, passing only the AC component to the low pass filter 95. This filter is a second order low pass filter, which passes all frequencies below about 40 Hz., since no information above 40 Hz. is of value, in that the circuitry is monitoring a signal produced by the firing frequency of a piston. The resistor 102 matches the impedance of the non-inverting input of the op amp 96 with that of the inverting input. Similarly, in the high pass filter 105, the resistor 109 is an impedance matching resistor. The high pass filter 105 is designed to pass all frequencies above 10 Hz. Frequency components below 10 Hz. cause vertical drift on the output waveform making it difficult to visualize. The output level of the signal from the high pass filter 105 is amplified by the output level adjusting circuit 110, the level of amplification being determined by the ratio of the resistances of the potentiometer 114 and the resistor 112, the former being adjustable. The resistor 113 provides a ground reference.

Referring now also to FIGS. 5A and B, the operation of the contact tachometer 30 in cooperation with the engine analyzer 20 will be described. Initially, the engine analyzer 20 is connected to the engine 10 in the configuration illustrated in FIG. 1, with the pickup 27 clamped over the wire 12 of the no. 1 spark plug 13. With the engine 10 idling, the handle 31 of the contact tachometer 30 is manually held by the user and the frictional surface 56 of the encoder wheel 55 is held against one of the readily accessible, external, linearly moving parts of the engine, such as the fan belt 15. It will be appreciated that other external moving parts could also be utilized, such as other belts, the harmonic balancer or a pulley. The encoder wheel 55 rotates at a speed proportional to the linear speed of the moving engine part with which it is engaged, which latter speed is, in turn, proportional to the speed of the engine 10.

As the encoder wheel 55 turns, it interrupts the light beam of the LED 58, providing an output signal in the form of a train of pulses with a frequency proportional to the engine speed, i.e., the width of and the time between pulses become smaller as the speed increases and larger as the speed decreases. This signal is amplified and shaped by the encoder circuit 60, which outputs a square wave which is buffered by the buffer amplifier 72 and then squared in the comparator 80 to provide a fast-switching transition for the frequency-to-voltage converter 85. The output of the frequency-to-voltage converter 85 is a voltage fluctuation directly related to the change in speed of the moving engine part, with the voltage amplitude being directly proportional to the frequency. This signal is then filtered to pass only frequencies between 10 and 40 Hz., which will cover the normal range of engine idle speeds, i.e., from about 600 rpm to about 1200 rpm, for engines of from four to eight cylinders.

The reason that the voltage signal and, therefore, the speed of the moving part fluctuate is the intermittent nature of the power source, i.e., the discrete ignition events of individual cylinders spaced apart in time. This results in a cyclical acceleration and deceleration of the engine crankshaft 14. Each time a cylinder ignition event occurs the engine first accelerates and then decelerates until the ignition event for the next cylinder. Referring to FIG. 5A, there is illustrated a waveform 120 generated by the use of the contact tachometer 30 on an engine operating normally. The waveform 120 represents one complete engine cycle of a six-cylinder engine, and comprises a number of valleys 121 and peaks 122 in a generally sinusoidal shape. Each of the valleys 121 represents the firing of a cylinder which initiates the power stroke of the cylinder. From this point, the engine accelerates up to a peak speed at 122, and then begins to decelerate again until the ignition event for the next cylinder. As can be seen, the amplitudes of the peaks 122 are generally the same, indicating that each of the cylinders is contributing approximately the same power to the overall engine output.

Referring to FIG. 5B, there is illustrated a waveform 125 which is generated by the contact tachometer 30 applied to the same engine used in FIG. 5A, but with the third and sixth cylinders misfiring. After ignition of the second cylinder, the engine speed reaches a peak at 126 and then begins to slow down to point 127, at which time ignition should occur in the third cylinder. In this case the cylinder ignition event does not occur, so that the engine does not accelerate, but rather continues to decelerate to the point 128 at which ignition occurs in the fourth cylinder. This begins to bring the engine speed back up to where it was. However, because the speed has dropped so far, it takes the power contribution of two cylinders to bring it back up to its original peak value at 126. Thus, the ignition in the fourth cylinder accelerates the engine to an intermediate level at 129 and then, when ignition occurs in the fifth cylinder at 129a, the engine is accelerated all the way back up to the level achieved at 126. The engine then decelerates to the time at which ignition is to occur in the sixth cylinder at 129b, but since there is a misfire the engine continues decelerating to the point 129c at which ignition occurs in the first cylinder.

The failure of the waveform to rise at the time for ignition in a cylinder clearly indicates a drop in power output from that cylinder. This power drop could result not only from a short of the spark plug or other misfiring but also could result from mechanical or fuel system problems. Whatever the source, the faulty cylinder can be identified because the microprocessor 21 synchronizes the waveform with the ignition event of the no. 1 cylinder, as detected by the pickup 27, so that the individual cylinders in the ignition order can, if desired, be labeled on the oscilloscope 25. Thus, whenever the engine has a problem which is related to a specific cylinder, the aberrant portion of the engine cycle waveform will always be associated with that cylinder, so that it can be readily identified.

As was indicated above, the speed of the engine part being monitored is proportional to the engine speed, but is not identical thereto. Thus, the frequency of the waveform seen on the oscilloscope 25 will be a function of the actual engine rpm, the number of cylinders in the engine and the diameter of the pulley or belt being contacted by the tachometer 30. But it is a significant aspect of the present invention that the actual ratio between the linear speed of the moving part and the engine speed need not be known since, in order to detect the malfunctioning cylinder, it is only necessary to determine a relative imbalance in power contribution, which requires detection of only relative speed changes during an engine cycle. Thus, absolute speed values need not be determined. It is the shape of the waveform which is significant and not its absolute amplitude.

In a constructional model of the contact tachometer 30, the encoder wheel 55 is sized with an appropriate number of holes 57 to chop the light beam at a sufficient frequency to provide suitable resolution for monitoring the instantaneous speed fluctuations of the engine. Its mass is low, thus requiring minimum friction to remain true to the speed of the moving engine part. The bearing 51 is preferably formed of nylon, and the handle 31 may be constructed of aluminum so as to provide a level of electrical shielding for the circuitry. While the present invention is shown as including an engine analyzer, it will be appreciated that the output of the contact tachometer 30 could be applied to any other type of real-time display device or to another type of graphical output device, such as a printer.

From the foregoing, it can be seen that there has been provided an improved method and apparatus for determining the cylinder power balance of an internal combustion engine simply by access to a readily accessible external moving part of the engine by means of a portable hand-held speed sensing device. The technique is simple and economical and provides an accurate determination of the relative power contribution without requiring any absolute speed measurements from the engine.

We claim:

1. Apparatus for determining the relative power contributions of individual cylinders of a multi-cylinder internal combustion engine mounted in a vehicle and having an external moving part accessible from outside the engine and which moves at a speed proportional to the speed of the engine, wherein an engine cycle is the time period between consecutive ignition events of the same cylinder, said apparatus comprising: manually operable and portable speed sensing means for detecting the linear speed variations of the external moving part of the engine during an engine cycle and generating an electrical output signal indicative thereof, processing means coupled to said speed sensing means and responsive to said output signal for generating a waveform signal representative of the linear speed variations of the moving part over time, and display means coupled to said processing means for displaying a signal engine cycle of the waveform signal.

2. The apparatus of claim 1, wherein said speed sensing means is a contact tachometer.

3. The apparatus of claim 2, wherein said tachometer includes a rotary encoder engageable with and rotatable by the external moving part for generating a pulse train the frequency of which is proportional to the speed of the moving part.

4. The apparatus of claim 3, wherein said tachometer includes a hollow handle and means rotatably mounting said rotary encoder on said hollow handle, said apparatus further comprising amplifier means disposed in said hollow handle and coupled to said rotary encoder for generating an output signal.

5. The apparatus of claim 3, wherein said processing means includes a frequency-to-voltage converter for generating a waveform signal, the voltage of which is proportional to the frequency of the output pulse train from said rotary encoder.

6. The apparatus of claim 1, wherein said display means includes an oscilloscope.

7. The apparatus of claim 6, and further comprising an engine analyzer including said display means and said processing means.

8. Apparatus for determining the relative power contributions of individual cylinders of a multi-cylinder internal combustion engine mounted in a vehicle and having an external moving part accessible from outside the engine and which moves at a speed proportional to the speed of the engine, wherein an engine cycle is the time period between consecutive ignition events of the same cylinder, said apparatus comprising: a manually operable and portable contact tachometer having a rotary encoder engageable with and rotatable by the external moving part and responsive to linear movement thereof for generating an electrical output signal corresponding to the linear speed of the moving part, said tachometer having a two-part handle with the parts cooperating to define a clevis and means rotatably supporting said rotary encoder in said clevis, processing means coupled to said tachometer and responsive to said output signal for generating a waveform signal representative of the speed of the moving part and indicating variations in such speed during an engine cycle, and display means coupled to said processing means for displaying a single engine cycle of the waveform signal.

9. The apparatus of claim 8, wherein said handle includes means defining a hollow chamber therein.

10. The apparatus of claim 9, wherein said processing means includes circuitry disposed in said handle chamber.

11. The apparatus of claim 10, wherein said processing means includes an amplifier and a frequency-to-voltage converter.

12. The apparatus of claim 8, wherein said display means includes a cathode-ray tube oscilloscope.

13. A method for determining the relative power contributions of individual cylinders of a multi-cylinder internal combustion engine mounted in a vehicle and having an external moving part accessible from outside the engine and which moves at a linear speed porportional to the speed of the engine, wherein an engine cycle is the time period between consecutive ignition events of the same cylinder and wherein a cylinder cycle is the time period from the ignition event of one cylinder to the ignition event of the next cylinder in the ignition order, said method comprising the steps of: manually detecting the linear speed of the external moving part during an engine cycle with a portable speed sensing device to produce an electrical output signal, processing the output signal to generate a waveform signal representative of the linear speed variations of the moving part over time, displaying the waveform signal as a graph in which speed and time are respectively measured along orthogonal axes such that the cylinder cycles occupy substantially equal distances along the time axis, and comparing the cylinder cycles of the waveform during a single engine cycle.

14. The method of claim 13, wherein the speed of the external moving part is detected with a contact tachometer.

15. The method of claim 14, wherein the output signal is a pulse signal having a frequency proportional to the speed of the external moving part, the waveform signal having an amplitude which is proportional to the frequency of the pulse signal.

16. The method of claim 15, wherein the displaying step includes providing a real time display of the waveform signal.

17. The method of claim 16, and further comprising the step of providing a signal each time an ignition event occurs in the first cylinder in the ignition order to permit identification of the cylinders in the waveform signal.

* * * * *